United States Patent [19]

Haile

[11] 3,726,042
[45] Apr. 10, 1973

[54] PLANTING WALL

[76] Inventor: Ernest Haile, 30 Cadwalader Terrace, Trenton, N.J.

[22] Filed: Nov. 12, 1970

[21] Appl. No.: 88,757

[52] U.S. Cl. .....................47/34.12, 52/584, 256/19
[51] Int. Cl. .................................................A01g 9/02
[58] Field of Search..................47/32–33, 34.12, 34; 52/584, 597; 256/19

[56] References Cited

UNITED STATES PATENTS

| | | | |
|---|---|---|---|
| 986,395 | 3/1911 | King | 47/33 |
| 855,048 | 5/1908 | Curlett | 52/584 |
| 1,268,649 | 6/1918 | Velde | 47/34.12 X |
| 2,514,536 | 7/1950 | Burney | 47/34 |

FOREIGN PATENTS OR APPLICATIONS

| | | |
|---|---|---|
| 4,781 | 1905 | Great Britain |
| 564,979 | 10/1944 | Great Britain |

Primary Examiner—Robert E. Bagwill
Attorney—Sperry and Zoda

[57] ABSTRACT

Apparatus is provided for forming a planting wall including a plurality of prefabricated planting blocks. Each of the planting blocks may comprise a pair of spaced end walls arranged in mutual parallel relationship. A second pair of walls may be provided in each block to interconnect the first pair of walls. The planar extension of each of the second pair of walls may be generally normal to the planar surfaces of the end pair of walls. The second pair of walls may be formed coincident with planes which converge along the downward extensions thereof. Notches may be formed in the upper and lower marginal edge portions of the spaced end walls for receiving a clip member which is operable to hold two similar planting blocks in end-wall-to-end wall abutting relationship. The clip member may be formed with an upwardly extending portion which is received in the lower notch of a next upper adjacent planting block. The clip member is further provided with downwardly extending portions which may be hooked over the upper notches of the next adjacent lower planting block.

1 Claim, 7 Drawing Figures

PATENTED APR 10 1973 3,726,042
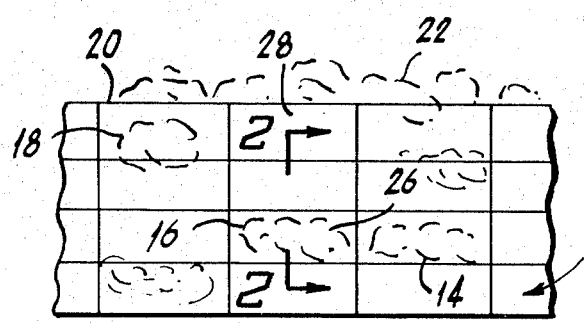
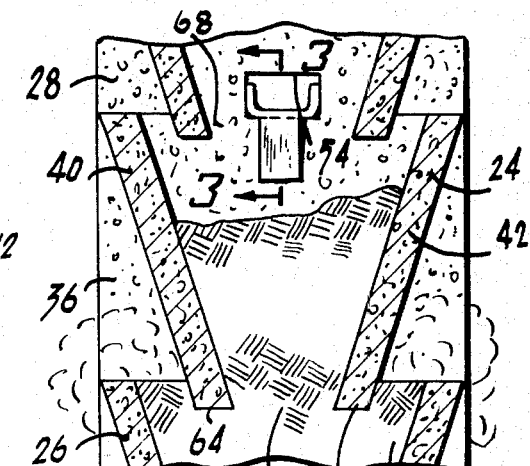
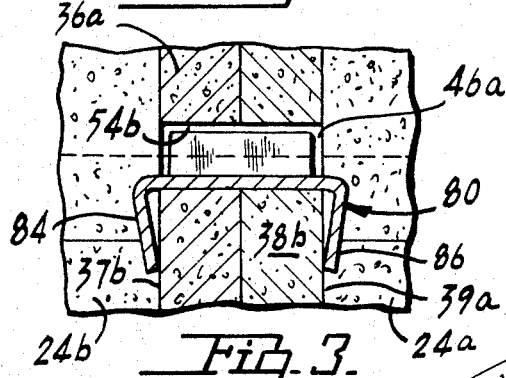
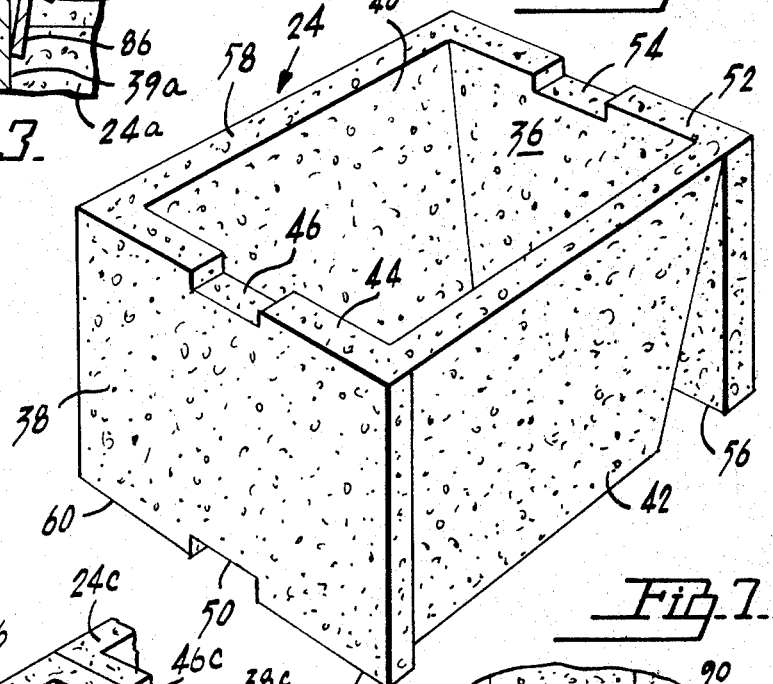
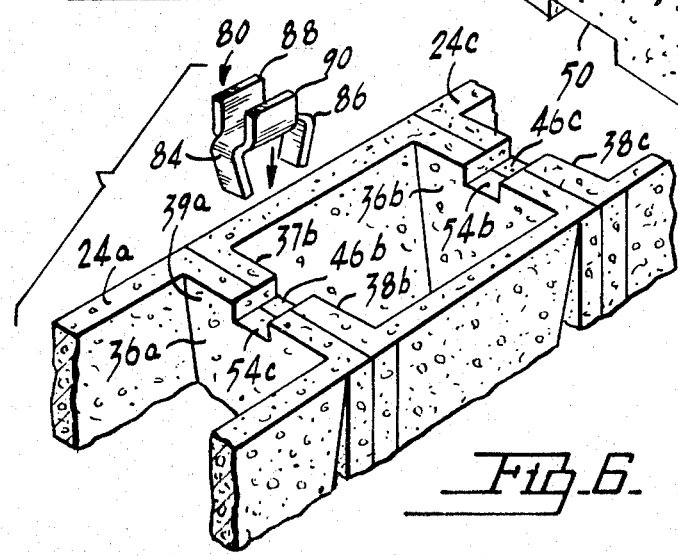
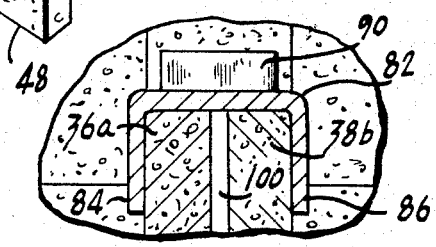
INVENTOR.
ERNEST HAILE
BY Sperry and Zoda
ATTORNEYS

PLANTING WALL

BACKGROUND OF THE INVENTION

The invention relates to improvements in wall construction and, more specifically, the invention relates to prefabricated blocks comprising masonry and utilized in the construction of planting walls without the use of mortar.

Prefabricated building blocks of masonry or similar material have long been known to be useful in the construction of garden or retaining walls. These walls may be formed with a column of soil extending vertically therethrough and may present openings along the vertical outer surfaces thereof for displaying flowers and the like.

Two examples of such planting walls are illustrated in U.S. Pat. Nos. 2,513,711, issued to Cain, and 2,514,536, issued to Burney. Each of these patents show individual blocks for constructing planting walls, which blocks are quite intricate and generally difficult to manufacture. Although the individual blocks shown by Cain and Burney could be merely stacked, one upon the other, it does not appear that the resulting structure comprising the individual blocks would be susceptible of forming a sound structure unless binding material such as mortar were provided between the various blocks.

In an attempt to simplify the construction of planting walls, the inventor of the present invention devised a prefabricated block which is especially advantageous when formed of a plastic material and which has an interlocking feature for forming a planting wall when properly stacked. This invention by the present inventor is evidenced by U. S. Pat. No. 3,389,499, and represents a decided improvement over prior existing planting wall blocks.

The present inventor has found, however, that the configuration of the planting wall block disclosed in his U.S. Pat. No. 3,389,499, while providing many advantages when comprised of a non-brittle material such as plastic, did have shortcomings when formed of a brittle material such as masonry.

The planting wall blocks of U. S. Pat. No. 3,389,499 are designed to be secured in end-to-end relationship by a locking lug which is of a hook-like nature and extends from the upper marginal edge of a next adjacent block. The locking lug comprises the same masonry material as the block itself and, consequently, the connection between the two blocks sometimes fails when the planting wall experiences contraction or expansion due to temperature changes or ice formation between the blocks. Also, the brittle nature of the connecting lug sometimes results in the cracking or breakage of the lug while the planting blocks are in transit or being installed.

It would, therefore, be desirable if a prefabricated planting wall block were provided which eliminated or substantially minimized the problems attending the use of existing masonry planting wall blocks.

OBJECTS AND SUMMARY OF THE INVENTION

It is, therefore, an object of the present invention to provide improved apparatus for constructing planting walls which structure minimizes or eliminates many of the problems attending existing such structures. It is another object of the present invention to provide a planting wall comprising blocks and connecting apparatus which may resiliently give with the contraction and expansion experienced in cold weather and due especially to the freezing and melting of ice disposed between the blocks of a planting wall.

It is yet another object of the present invention to provide a planting block and block connecting apparatus which may be used to form a planting wall having a highly decorative appearance so as to have particular utility for attractively setting off various areas, such as, walks, gardens, patios, etc.

It is a further object of the present invention to provide a wall block and block connecting apparatus which may be easily and quickly arranged by unskilled workers to form a planting wall.

It is still a further object of the present invention to provide planting wall block and connecting means which may be used to form a planting wall without the use of mortar or any similar such binder.

It is yet a further object of the present invention to provide planting wall block and connecting apparatus which may be arranged to present a variety of combinations so as to vary the appearance of finished planting walls.

It is another object of the present invention to provide apparatus for constructing a planting wall wherein substantially the entire interior thereof is hollow for the retention of soil or the like as a plant growing medium.

It is another object of the present invention to provide a prefabricated planting wall block which is especially advantageous when comprised of a brittle material.

At least some of the above listed objects of the present invention are achieved by the provision of a planting wall block and resilient clip means for securing the block in abutting end-to-end relationship with another similar block. The block may comprise four generally vertically extending walls. Two of the walls may be spaced in mutual parallel relationship and formed with notches in the upper and lower marginal edges thereof. The two remaining walls may be disposed generally normal to the planar extensions of the first two walls and may be in interconnecting relationship therewith.

The remaining walls may be further arranged to be angled with respect to each other so that the planes extending coincident with each of the second two walls would intersect in a line below the block. The resilient clip means fits within a groove formed by the notches of two abutting end wall surfaces of two similar adjacent blocks.

In an independent feature of the invention, the clip means is provided with two parallel upwardly extending projection means which may fit snugly within the notches formed in the lower marginal edges of walls of the two next upper adjacent blocks to prevent displacement by a shear force to the side. The clip means is also provided with two downwardly extending projection means that slant slightly toward each other as they extend downward.

As the clip rests in working position within the notches formed in the upper marginal edges of the walls of the two next lower adjacent blocks, the tips of the downwardly extending projections bear resiliently against the two end walls of the lower adjacent blocks.

BRIEF DESCRIPTION OF THE DRAWINGS

While the invention is particularly pointed out and distinctly claimed in the concluding portion of the specification, a preferred embodiment is set forth in the following detailed description which may be best understood when read in connection with the accompanying drawing in which:

FIG. 1 is a front elevation of a planting wall constructed in accordance with the present invention;

FIG. 2 is a sectional view of the planting wall shown in FIG. 1, taken along line 2—2;

FIG. 3 is a sectional view of the apparatus shown in FIG. 2 taken along line 3—3;

FIG. 4 is a perspective view of a planting wall block according to the present invention;

FIG. 5 is a perspective view of a clip apparatus for securing together two planting blocks as shown in FIG. 4, and FIG. 6 is an exploded perspective view showing two planting blocks of the present invention in end wall abutting relationship and further showing the clipping apparatus of FIG. 5 positioned for proper installation with respect to the two planting blocks.

FIG. 7 is a sectional view of the clip under freezing temperatures.

DETAILED DESCRIPTION OF THE PREFERRED EMBODIMENT

Referring now to the drawing in which like numerals are used to indicate like parts throughout the various views thereof, FIG. 1 shows a planting wall constructed of masonry in accordance with the present invention.

The wall 10 comprises vertical columns and horizontal layers or files which are formed by the side-by-side stacking of planting wall blocks according to the present invention. It can be seen by a perusal of FIG. 1, that flowers, plants, or the like, may grow generally upwardly and outwardly from various openings arranged along the vertical face 12 of the planting wall 10. In the particular design shown in FIG. 1, a diagonal line of openings is provided for displaying plants indicated as 14, 16 and 18. The upper portion 20 of the planting wall 10 may present an open field of soil for growing plants 22 along the top marginal edge of the planting wall 10.

FIG. 2 is a cross sectional view taken along 2—2 shown in FIG. 1. FIG. 2 shows a planting block 24, according to the present invention, juxtaposed between two similar blocks 26 and 28.

Referring to FIG. 4 in connection with FIG. 2, the planting block 24 generally comprises a first pair of spaced walls, 36 and 38, extending mutually parallel and a second pair of mutually inclined walls, 40 and 42, which are disposed generally normal to the planar surface of the walls 36 and 38. The walls 40 and 42 interconnect the walls 36 and 38 and may be coincident with planes which, when extended, converge along the downward extension thereof to intersect at an imaginary line beneath the block 24.

An upper marginal edge 44 of the wall 38 is formed to define a notch 46, which may be disposed midway along the extension of the marginal edge 44. A lower marginal edge 48 of the wall 38 may be formed to define a lower notch 50 which is generally vertically aligned with the upper notch 46 of the wall 38.

An upper marginal edge 52 of the wall 36 is formed to define a notch 54 which is disposed generally midway along the extension of the marginal edge 52. Similarly, a lower marginal edge 56 of the wall 36 may be formed to define a notch 58 (See FIG. 2) which is generally vertically aligned with the notch 54 formed in the upper marginal edge 52 of the wall 36.

The upper overall marginal surface 58 and the lower overall marginal surface 60 of the planting block 24 may be generally planar with the exception of the notches 46, 50, 54 and 58. These planar surfaces facilitate the proper stacking of a planting block on top of another planting block. The lower marginal edges 48 and 56 of the parallel walls 36 and 38 define two sides of a generally rectangular base profile in plan view. No portion of the block extends beyond this base profile.

As shown in FIG. 2, the downwardly converging walls 40 and 42 define a space 62 at a lower portion thereof between the edges 64 and 66. The lower space 62 is more narrow than an upper space 68 defined by the upper edges 70 and 72 of the walls 40 and 42 respectively. The walls 40 and 42 thereby form a tapered vertical channel or chamber for retaining plant life supporting material such as soil or the like. The blocks 26 and 28 are similarly hollow to continue the extension of an overall vertical column for retaining plant life supporting material when the blocks are properly stacked. In FIG. 2, the soil column extends only midway up the central block 24.

Referring to FIG. 2, it can be seen that the upper edges 32 and 33 of the lower block 26 cooperate with the walls 40 and 42 of the planting wall block 24 to define upwardly and outwardly extending spaces 74 and 78. It is through these spaces 74 and 78 that plant life growing in a column of soil retained within the overall planting wall may extend upwardly and outwardly into the outer environment.

Referring to FIGS. 3 and 5, a clip 80 is shown which clip may be used to hold the two planting blocks in side-by-side abutting relationship.

The clip 80 comprises a generally planar body 82 having legs 84 and 86 extending generally vertically downwardly therefrom. The legs 84 and 86 may be mutually inclined toward each other. Upwardly extending projections or ribs 88 and 90 are also formed on the clip body 82 and are arranged to extend generally normally of the plane of the clip body 82 and of the general planar extension of the downwardly extending leg members 84 and 86.

FIG. 3 shows the clip of FIG. 5 in an installed posture. In FIG. 3, planting block 24a is in abutting end-to-end relationship with another similar block 24b. The end walls 36a and 38b are in flush opposed face relationship.

The clip 80 is fit within a groove defined by the notches 54a and 46b. The lower portions of the leg members 84 and 86 of the clip 80 resiliently bear against the surfaces 39a and 37b. If the water should seep between the walls 36a and 38b, and subsequently be subjected to freezing temperatures so as to expand as ice 100, (See FIG. 7), the resilient clip member 80 is operable to give sufficiently to accomodate the expansion without cracking or breaking as would a non-ductile ceramic connection between the walls 36a and 38b.

In case the strain applied to the projections 84 and 86 should be of a magnitude to plastically deform the clip 80, the upwardly extending ribs 88 and 90 which run in a direction 90° to the general extension of the leg members 84 and 86, operate to strengthen the overall clip 80 against plastic deformation.

The upwardly extending projections 88 and 90 also serve to prevent the lower planar surface of a block from sliding laterally across the upper planar surface 58 of the next lower adjacent supporting block. These projections 88 and 90 extend upwardly into the lower notches 50 and 58 formed in the lower marginal surfaces 48 and 56 of the planting block. Due to the presence of the clips 80 within the lower notches 50 and 58, a supported block may not be laterally moved off the lower supporting block as might be the case when such a structure were stacked without the use of a binder such as mortar.

It can thus be seen that a prefabricated planting wall block and clip combination has been herein provided which combination provides a builder with the capability of constructing a planting wall without the use of mortar or similar such binder material. Since no portion of the block extends beyond the base portion thereof, a vertical stack of such blocks has greater stability than heretofore possible. The clip portion of the combination provides a means of connecting masonry planting wall blocks in side-by-side relationship in a resilient manner so that the contraction or expansion of the walls due to temperature change and icing conditions will not fracture or break the connection between end-to-end abutting adjacent blocks.

The building block according to the present invention provides an unskilled worker with the means for constructing a planting wall having a highly decorative appearance. The planting wall block according to the present invention permits such a planting wall to be quickly and easily erected in a variety of combinations so as to vary the appearance of the planting walls as desired. The hollow nature of the planting wall blocks of the present invention forms a hollow interior planting chamber for retaining plant life supporting material such as soil or the like, which chamber extends vertically downwardly throughout the full vertical extension of the wall. The planting wall arrangement of the present invention permits the planting of flowers, or the like, through openings arranged along the vertical extension of the wall and along the upper marginal portions thereof.

SCOPE OF THE INVENTION

While what has been shown is a preferred embodiment of the present invention, it is, of course, to be understood that various modifications and changes may be made therein without departing from the true spirit and scope of the invention. For example, the block may consist of any structural material and is not limited to brittle materials. Therefore, it is intended to cover in the following claims all such modifications and changes as may fall within the true spirit and scope of the present invention.

What I claim is:

1. A planting wall, composed at least in part of a series of blocks interlocked against relative longitudinal and transverse movement in an arrangement that includes an upper pair of blocks abutting end-to-end and superimposed upon corresponding end-abutting blocks of a lower pair in vertical alignment therewith, the blocks of at least the upper pair including vertical end walls integral with side walls, said side walls converging downwardly from the ends of the upper edges of said end walls and projecting below the bottom edges of the end walls in abutting relation with the end walls of the respective, corresponding blocks of the lower pair that are vertically aligned therewith, whereby to engage the blocks of each pair against longitudinal movement relative to the corresponding blocks of the other pair, the several end walls of the blocks of both pairs being notched top and bottom, bottom notches of the blocks of the upper pair communicating with each other and with top notches of the blocks of the lower pair; and a metal clip common to the blocks of both pairs, said clip straddling adjacent end walls of the abutting blocks of both pairs and being engaged in the several communicating notches across the full width of the notches to interlock the blocks of each pair against transverse movement relative to the blocks of the other pair.

* * * * *